United States Patent [19]

Yazuka et al.

[11] Patent Number: 4,584,692
[45] Date of Patent: Apr. 22, 1986

[54] DATA TRANSMITTING-RECEIVING SYSTEM

[75] Inventors: Hiroyuki Yazuka, Kawasaki; Isao Nakazawa, Isehara, both of Japan

[73] Assignee: Fujitsu Limited, Kawasaki, Japan

[21] Appl. No.: 558,340

[22] Filed: Dec. 5, 1983

[30] Foreign Application Priority Data

Dec. 7, 1982 [JP] Japan ................................ 57-214193

[51] Int. Cl.⁴ ............................................................ H04K 1/10
[52] U.S. Cl. ...................................... 375/38; 455/104; 455/60
[58] Field of Search ................ 455/59, 60, 61, 104, 455/27, 28, 616; 375/38, 39, 67; 343/361; 370/20, 2

[56] References Cited

U.S. PATENT DOCUMENTS

| | | | |
|---|---|---|---|
| 2,161,320 | 6/1939 | Schulze-Herringen | 455/104 |
| 2,273,161 | 2/1942 | Usselman | 455/60 |
| 2,273,911 | 2/1942 | Usselman | 455/60 |
| 2,288,802 | 7/1942 | Hammond, Jr. | 343/361 |
| 3,272,988 | 9/1966 | Bloom et al. | 370/20 |
| 3,971,930 | 7/1976 | Fitzmaurice et al. | 455/616 |
| 4,002,825 | 1/1977 | Lewis | 455/60 |
| 4,084,137 | 4/1978 | Welti | 343/361 |
| 4,233,576 | 11/1980 | Pelchat | 370/20 |
| 4,267,591 | 5/1981 | Wissel et al. | 375/38 |

Primary Examiner—Benedict V. Safourek
Assistant Examiner—Kenneth I. Rokoff
Attorney, Agent, or Firm—Staas & Halsey

[57] ABSTRACT

A data transmitting-receiving system including both a transmitter part and a receiver part. The transmitter part transmits a modulation signal on one of the vertically and horizontally polarized waves and, at the same time, transmits a carrier on the other of the waves. The modulation signal on one of the waves is received and demodulated by the receiver part with the carrier on the other of the waves also received by the receiver part.

27 Claims, 13 Drawing Figures

DATA TRANSMITTING-RECEIVING SYSTEM

BACKGROUND OF THE INVENTION

1. Field of the Invention

The present invention relates to a data transmitting-receiving system in which digital modulation signals are synchronously detected and then demodulated by using a carrier. More particularly, the present invention relates to such a system wherein the synchronous detection can be achieved at a receiver part of the system, without utilizing a carrier which would usually be obtained through a carrier recovery operation at the receiver part.

2. Description of the Prior Art

In a prior art data transmitting-receiving system in which digital modulation signals modulated under, for example, a phase shift keying (PSK) method, are demodulated, at a receiver part thereof, through the synchronous detection operation, it is inherent to achieve, at the receiver part, a carrier recovery from the transmission signal. The synchronous detection for the transmission signal is then performed with the use of the thus recovered carrier so as to demodulate and obtain the original data.

However, there are problems with the prior art system, in that, first, usually a very complex circuit is required to achieve the carrier recovery, which makes the whole circuit construction complicated; and, second, it is difficult to achieve the carrier recovery while maintaining the phase constant over a wide frequency band, where the frequency stability of the carrier is poor, so that a phase error is increased and the quality of the signals is inevitably deteriorated when processed in the demodulation circuit part.

SUMMARY OF THE INVENTION

It is in an object of the present invention to solve such problems involved in the prior art, by providing a data transmitting-receiving system in which the digital modulation signals from a transmitter part are synchronously detected and then demodulated at the receiver part, thereby avoiding the usual carrier recovery operation at the receiver part, and enabling a simplified circuit construction.

The above object is attained by the following. Both the digital modulation signals (under, for example, the PSK modulation method) and a carrier are separately transmitted with a vertically (V) polarized wave and a horizontally (H) polarized wave, respectively. The thus transmitted digital modulation signals on the V polarized wave are synchronously detected by the thus transmitted carrier on the H polarized wave at the receiver part, the digital modulation signals are then demodulated, and thereby, the usual carrier recovery operation is eliminated from the receiver side.

BRIEF DESCRIPTION OF THE DRAWINGS

The present invention will be more apparent from the following description with reference to the accompanying drawings, wherein:

FIGS. 1A and 1B are block diagrams of a data transmitting-receiving system according to the present invention;

DESCRIPTION OF THE PREFERRED EMBODIMENTS

FIGS. 1A and 1B are block diagrams of a data transmitting-receiving system according to the present invention. FIG. 1A is a block diagram of the transmitter part of the system, while FIG. 1B is a block diagram of the receiver part thereof. It should be noted that the system shown in FIGS. 1A and 1B is operated under, for example, a two-phase PSK modulation method. In FIG. 1A, reference numeral 1 represents a carrier source. The output from the carrier source 1 is applied to a hybrid circuit (H) 2 and then branched, on one hand, into a PSK modulator (MOD) 3, and, on the other hand, to a polarizer (POL) 4. The polarizer 4 receives the outputs from both the modulator 3 and the hybrid circuit 2, and the thus polarized output is fed to a transmission antenna 5. The transmission signal S from the antenna 5 is caught by a receiving antenna 11 shown in FIG. 1B. The thus received signal is then branched, via a polarizer 12, into a first mixer (MIX) 13, and a second mixer (MIX) 14. The other input of each mixer receives an output from a local oscillator 15, which is common to both mixers 13 and 14. The output from the mixer 13 is applied, via an automatic gain control amplifier (AGC) 16, to one input of a phase detector 17. The other input of the phase detector 17 receives the output from the mixer 14, via an amplifier 18, a bandpass filter 19, and a delay circuit ($\tau$) 20. The output from the phase detector 17 is then supplied, via a low-pass filter 21, to a discriminator (DIS) 22, and to a bit timing recovery circuit (BTR) 23 cooperating with the discriminator 22.

Figure 2:
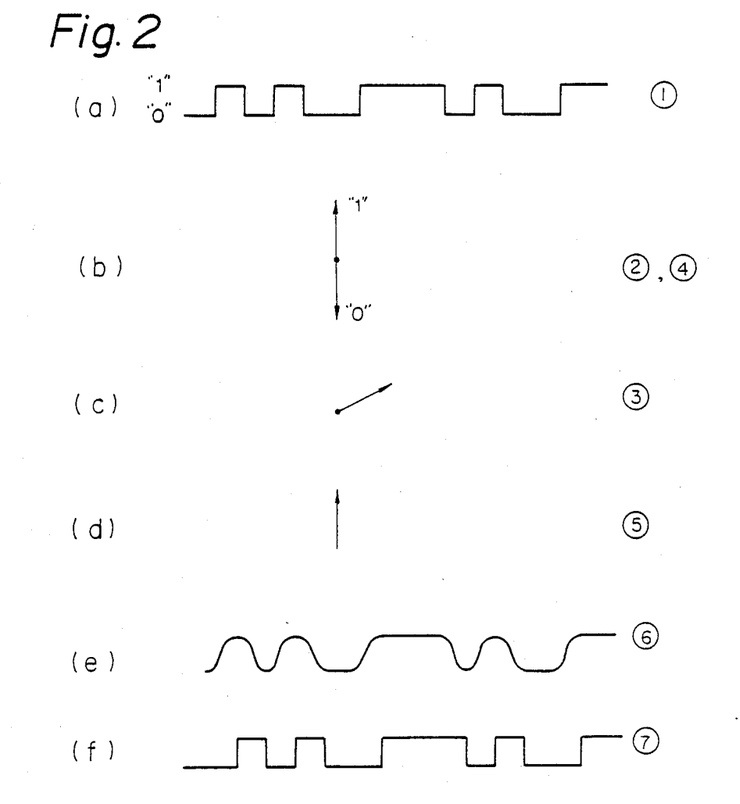
FIG. 2 schematically depicts signals appearing in the system of FIGS. 1A and 1B.

The operations of the system shown in FIGS. 1A and 1B will be clarified with reference to FIG. 2. FIG. 2 schematically depicts signals appearing in the system shown in FIGS. 1A and 1B. The basic concepts of the present invention will also be required with reference to FIG. 2. Referring to FIGS. 1A, 1B and 2, digital input data $D_{in}$ to be transmitted appears at a portion ①  with the waveforms exemplified in row (a). The carrier provided from the hybrid circuit 2 is modulated with the thus given digital input data $D_{in}$ in the modulator 3. Therefore, PSK modulation signals appear at a portion ②  with vectors as shown in row (b). Each PSK modulation signal has either one of the vectors having a phase difference of $\pi$ with respect to each other, in accordance with the logic "1" or "0" of the data $D_{in}$. The carrier from the hybrid circuit 2 is fed, on the other hand, directly to the polarizer 4 via a portion ③  with a vector having a phase difference of about $\pi/2$ with respect to each vector appearing at the portion ②, as shown in row (c). These signals, via the portions ② and ③, are both fed to the polarizer 4 and then transformed into the V polarized wave and H polarized wave, respectively, thus reaching the antenna 5 by way of, for example a circular waveguide 6. It is important to note that the phase difference between the modulation signal at ② and the carrier at ③ may be freely determined, however, it is most preferably determined to be in the vicinity of $\pi/2$ or just $\pi/2$, for reasons which will be analyzed hereinafter.

In the receiver part shown in FIG. 1B, the transmission signal S, composed of V and H polarized waves, is caught by the receiving antenna 11 and then supplied, via, for example a circular waveguide, to the polarizer 12. The polarizer 12 separates the received signal into the V and H polarized wave component signals. The thus separated V and H polarized wave component signals are input to the first and second mixers 13 and 14, respectively, in compliance with the separation of the V and H waves performed in the transmitter part. Each of these mixers 13 and 14 also receives a local oscillation signal so as to produce a conversion signal. It is important to note that the mixers 13 and 14 are driven by the same local oscillator 15. That is, as previously mentioned, the oscillator 15 is common to both mixers 13 and 14, and thereby, the conversion signals from the V and H-side mixers 13 and 14 have the same frequency. The output from the mixer 13 appears, via the AGC amplifier 16 for a level stabilization, at a portion ④ with the vectors shown in row (b), which vectors are identical to the corresponding modulation signals appearing at the portion ② in the transmitter part.

The other conversion signal, which is output by the H-side mixer 14, is amplified by the amplifier 18 to be a predetermined level and is then applied to the bandpass filter 19, through which deleterious noises are eliminated, so that only the carrier component signal is extracted therefrom. The carrier appears, via the delay circuit 20, at the portion ⑤ with a vector shown in row (d), which vector is adjusted in a phase by the delay circuit 20 to have the same phase or different phase by $\pi$ with respect to that of the vectors of the modulation signals at ④.

The phase detector 17 compares the phases of the modulation signal at ④ and the carrier at ⑤, so that a phase detection signal is produced therefrom having a level in proportion to an amount of the phase difference therebetween. Undesirable components of the phase detection signal are suppressed by the low-pass filter, and the noise suppressed signal having the waveforms of row (e) is obtained at a portion ⑥. The phase detection signal at ⑥ is supplied to the bit timing recovery circuit 23 so as to extract therefrom a clock defining a bit timing. The thus extracted clock is given to the discriminator 22 in which the phase detection signal is discriminated in synchonism with the clock, so that digital output data $D_{out}$ appears at a portion ⑦ having the waveform of row (f). The data $D_{out}$ at ⑦ is substantially the same as the data $D_{in}$ at ①. Thus, the modulation signal can be synchronously detected and demodulated without employing a conventional carrier recovery circuit in the receiver part. Further the system of the present invention produces the following two advantages. First, as is clear from the above explanation, since carrier recovery is not performed in the receiver part but the carrier is separately supplied from the transmitter part thereto, the system is operated under the so-called absolute phase modulation method, i.e., the modulation signal having the same phase as that of the carrier is allotted to be data "0" or "00" fixedly. It is known that the absolute phase modulation method is available for decreasing a data error rate. Second, even though undesirable signal leakage, at the polarizer 12, from the V-side to the H-side and vice versa, takes place, a bad effect due to the signal leakage can no longer occur at the phase detector 17. This will be clarified with reference to FIGS. 3A and 3B.

Figure 3A:
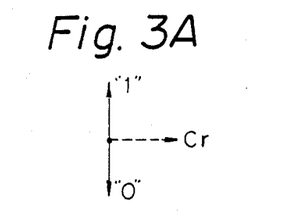
FIG. 3A is a vector diagram representing signals appearing at the polarizer 12 of FIG. 1B.
Figure 3B:
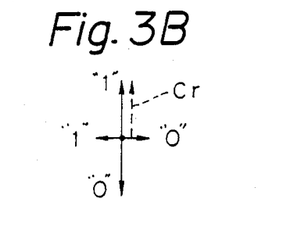
FIG. 3B is a vector diagram representing signals appearing at the phase detector 17 of FIG. 1B.

FIG. 3A is a vector diagram representing signals appearing at the polarizer 12, and FIG. 3B is a vector diagram representing signals appearing at the phase detector 17. The modulation signal of logic "1" and "0" has vectors indicated by solid line arrows in FIG. 3A (refer to row (b) in FIG. 2) and is given to the polarizer 12. Here, the carrier has a phase indicated by broken arrow Cr in FIG. 3A (refer to row (c) of FIG. 2). There is a likelihood of penetration of the modulation signal into H-side waveguide close to the polarizer 12, i.e., signal leakage occurs. This leakage signal travels to the phase detector via members 14 and 18 through 20. During this travel, a phase shift of about $\pi/2$ is effected to the leakage signal at the delay circuit 20. Therefore, the leakage signal is fed to the detector 17 with vectors as indicated by short and horizontally extended arrows in FIG. 3B. On the other hand, the carrier Cr traveling along the same route with the leakage signal is also given the phase shift of about $\pi/2$, as indicated by the broken arrow in FIG. 3B. Since the phase detection is achieved not between the carrier Cr and the leakage signal, but between the carrier Cr and the inherent modulation signal only, the signal leakage causes no problem in reproducing the data.

Figure 4A:
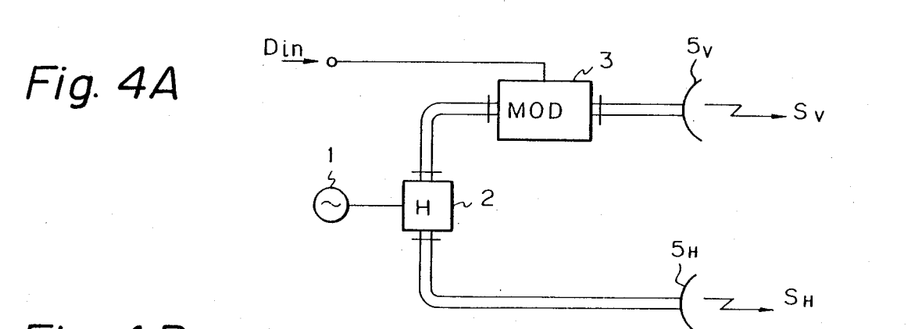
FIGS. 4A and 4B are block diagrams of a modified embodiment of the data transmitting-receiving system of FIGS. 1A and 1B.
Figure 4B:
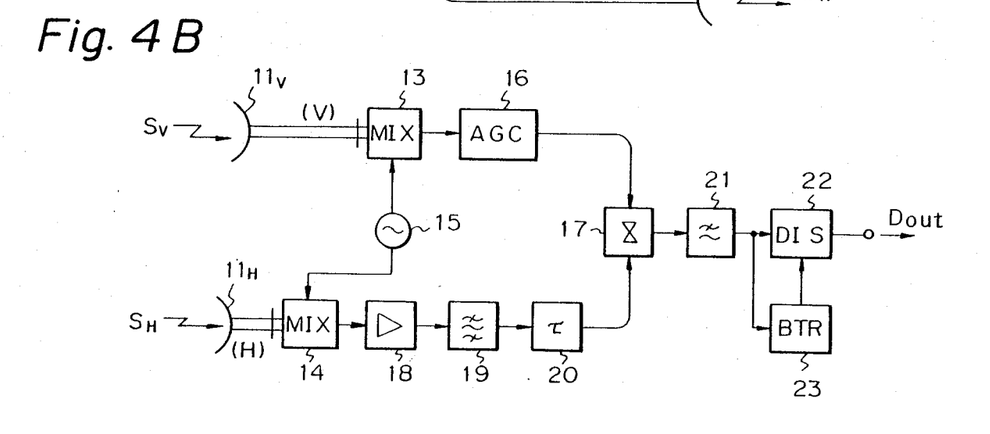

Alternatively, such signal leakage can be completely prevented by employing no such polarizer at the receiver part. FIGS. 4A and 4B illustrate a modified embodiment of the data transmitting-receiving system shown in FIGS. 1A and 1B. The difference here is that no polarizer 12 is used, but separate antennas are introduced into the system. Reference numerals $5_V$ and $11_V$ represent V polarized wave side antennas which are separate from H polarized wave side antennas $5_H$ and $11_H$, respectively. To use a common V·H polarized wave antenna with the polarizer or to use separate V and H antennas without the polarizer is a matter of choice. However, the following explanation of other systems will be made taking the common V·H polarized antenna type as an example.

The above explanation is made with reference to a system operated under, for example a two-phase PSK modulation method, however, a variety of modulation methods can be adapted to the present invention.

Figure 5A:
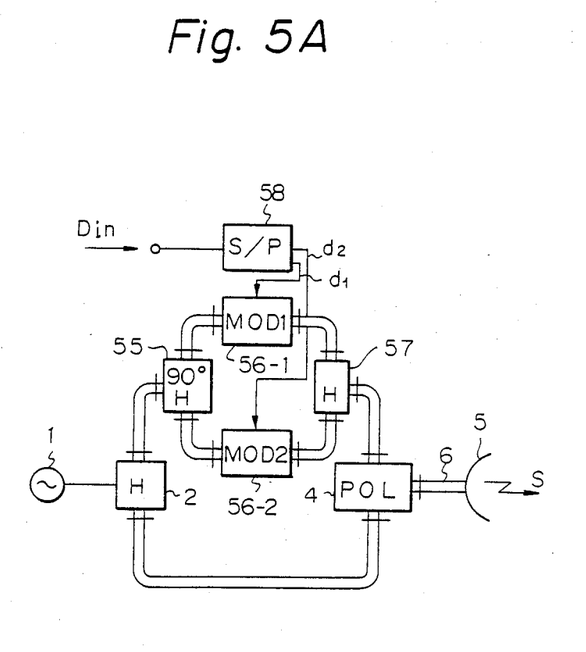
FIGS. 5A and 5B are block diagrams of a data transmitting-receiving system according to another embodiment of the present invention, operated under a four-phase PSK modulation method.
Figure 5B:
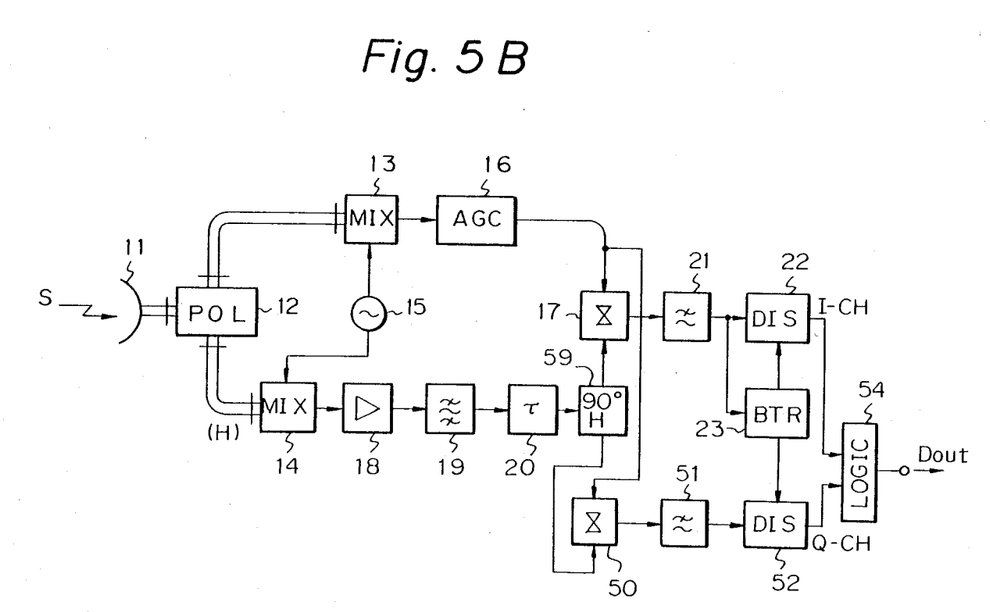

FIGS. 5A and 5B are block diagrams of a data transmitting-receiving system, according to the present invention, operated under a four-phase PSK modulation method. The same members throughout the figures are represented by the same reference numerals or characters. In FIG. 5A, a pair of modulators, i.e., a modulator (MOD1) 56-1 and a modulator (MOD2) 56-2, is inserted, via a 90° hybrid circuit 55 and a hybrid circuit 57, between the hybrid circuit 2 and the polarizer 4. The data $D_{in}$ is serially applied to a serial/parallel converter (S/P) 58 to produce each pair of data d1 and data d2. Thus, two carriers from the 90° hybrid circuit 55, having a phase difference of $\pi/2$ therebetween, are modulated by the data d1 and d2 in the modulators 56-1 and 56-2, respectively. The thus obtained two modulation signals are added to each other at the hybrid circuit 57 and transmitted, via the polarizer 4 and the antenna 5, to the receiver part. In the receiver part, the two modulation signals are demodulated into I (in-phase)-CH (channel) data and Q (quadrature)-CH data by a 90° hybrid circuit (90°H) 59, via members 21, 22, 23, and members 51, 52, 23, respectively. The thus obtained I and Q-CH data are processed in a known circuit 54 to produce the digital output data $D_{out}$. The relationship between the I and Q-CH data and the input data d1 and d2 is clarified in the following table.

TABLE

| I-CH | 0 | 1 | 0 | 1 |
|---|---|---|---|---|
| Q-CH | 0 | 0 | 1 | 1 |
| d1 | 0 | 1 | 1 | 0 |
| d2 | 1 | 0 | 1 | 0 |

Figure 6A:
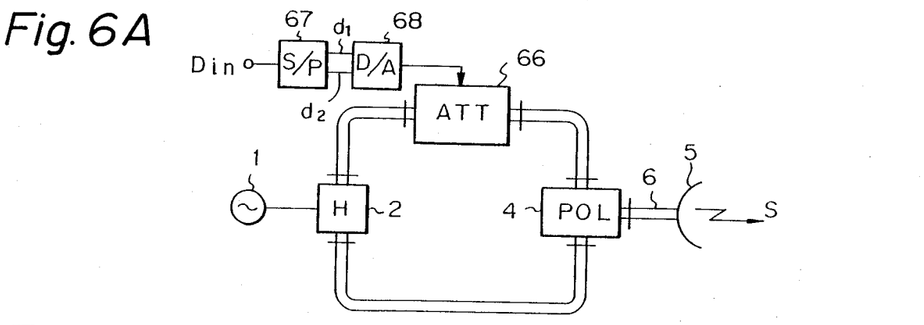
FIGS. 6A and 6B are block diagrams of a data transmitting-receiving system according to the present invention, operated under an amplitude shift keying (ASK) method.
Figure 6B:
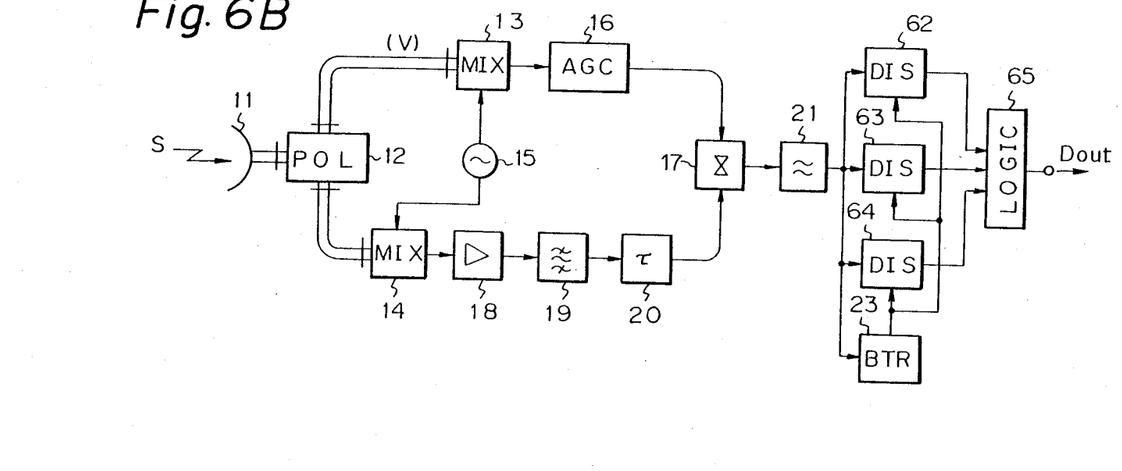

FIGS. 6A and 6B are block diagrams of a data transmitting-receiving system according to the present invention, operated under an amplitude shift keying (ASK) method. In FIG. 6A, a variable attenuator (ATT) is inserted between the hybrid circuit 2 and the polarizer 4. The attenuator 66 produces, for example, four modulation signals having different amplitudes with respect to each other in accordance with a combination of data d1 and d2, i.e., (00) (01) (10) and (11), which data are provided from a serial/parallel converter (S/P) 67 and tranformed, via a digital/analog converter (D/A) 68, into any one of the analog signals having four different levels. In the receiver part shown in FIG. 6B, the four different level signals are discriminated by three discriminators (DIS) 62, 63, and 64 with the aid of a logic circuit 65 to produce the digital output data $D_{out}$. The discriminators 62 through 64 can be level comparators having different reference levels for comparison.

Figure 7A:
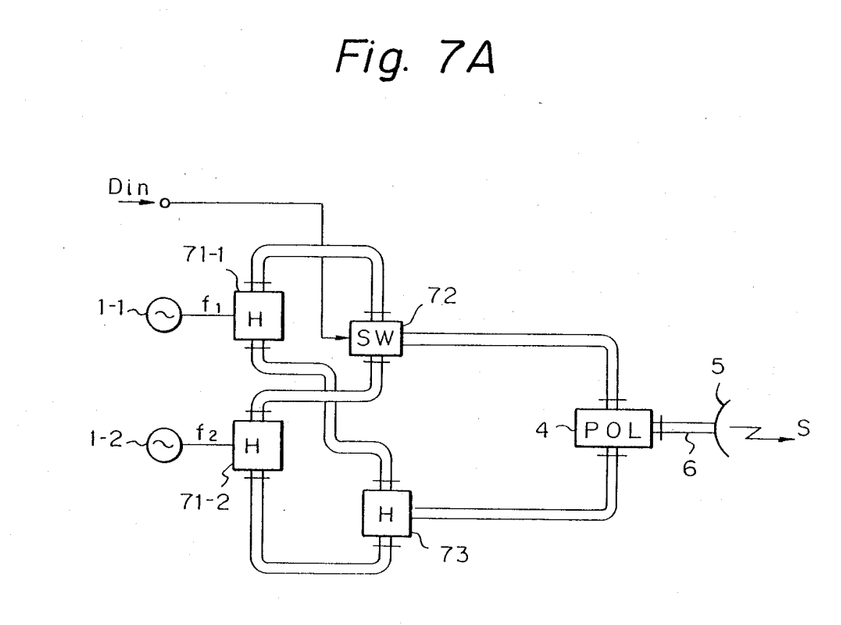
FIGS. 7A and 7B are block diagrams of a data transmitting-receiving system according to the present invention, operated under a frequency shift keying (FSK) modulation method.
Figure 7B:
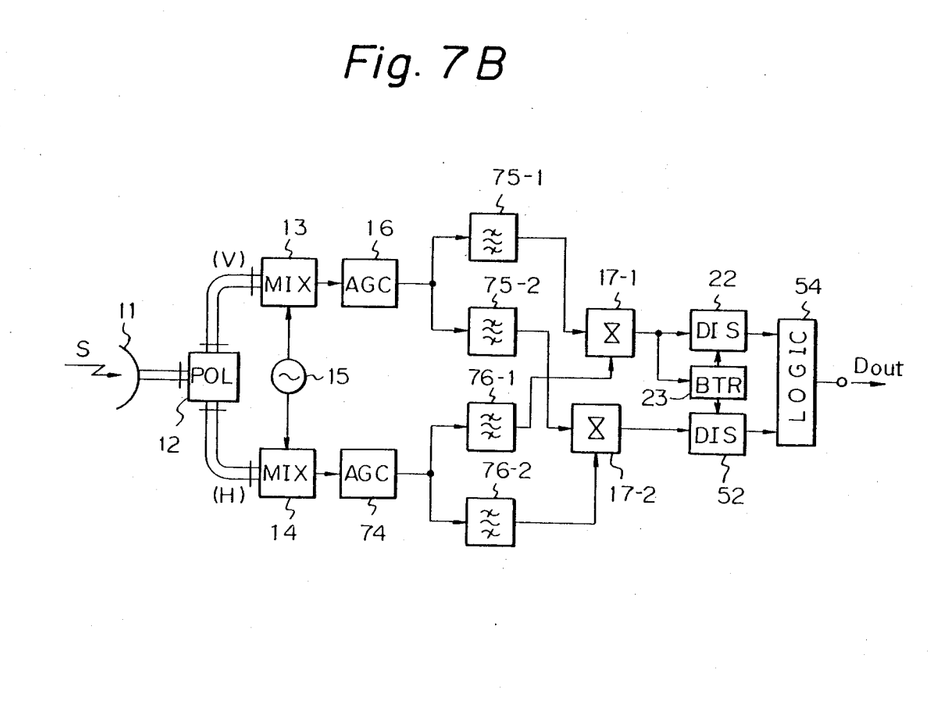

FIGS. 7A and 7B are block diagrams of a data transmitting-receiving system according to the present invention, operated under a frequency shift keying (FSK) modulation method. In a transmitter part shown in FIG. 7A, two carrier sources 1-1 and 1-2 exist for producing two carriers having frequencies of $f_1$ and $f_2$. The carrier $f_1$ from a hybrid circuit (H) 71-1 is fed to a switch 72 and a hybrid circuit 73. The carrier $f_2$ from a hybrid circuit (H) 71-2 is fed separately to the switch 72 and the hybrid circuit 73. The switch 72 produces either one of the carriers $f_1$ and $f_2$ selectively on the V polarized wave in accordance with the logic "1" and "0" of the digital input data $D_{in}$. The hybrid circuit 73 produces carriers having both frequencies of $f_1$ and $f_2$ on the H polarized wave. The FSK modulation signal from the transmitter part is received at the receiver part shown in FIG. 7B. The modulation signals with the frequencies of $f_1$ and $f_2$ are separated from each other by bandpass filters 75-1 and 75-2, respectively, and supplied to respective phase detectors 17-1 and 17-2, both identical to the aforesaid phase detector 17. The phase detectors 17-1 and 17-2 receive the respective carriers $f_1$ and $f_2$ (so as to achieve the demodulation) which are separated by and fed from the bandpass filters 76-1 and 76-2. The following members 22, 23, 52, and 54 are substantially the same as those explained before.

It should be recognized that the present invention can also be adapted to data transmitting-receiving systems operated under an eight-phase PSK modulation method, a sixteen-value quadrature amplitude modulation (QAM) method, a minimum shift keying (MSK) modulation method, and others.

As explained above in detail, the data transmitting-receiving system of the present invention needs no expensive carrier recovery circuit, as is conventional, and therefore, is beneficial to the concerned circuit constructions from an economical viewpoint and from the standpoint of size.

We claim:

1. A data transmitting-receiving system operatively connected to receive digital input data and first and second carriers, comprising:
    a transmitter part, operatively connected to receive the digital input data and the first carrier, for modulating the first carrier with the digital input data to obtain a modulation signal and for transmitting the modulation signal therefrom; and
    a receiver part, operatively connected to said transmitter part and operatively connected to receive the second carrier, for receiving the modulation signal and for demodulating the modulation signal with the second carrier, having the same frequency as that of the first carrier, to reproduce, as digital output data, the digital input data,
    said transmitter part including means for simultaneously transmitting the modulation signal on one of a vertically polarized wave and a horizontally polarized wave and for transmitting the first carrier to said receiver part on the other of the vertically and horizontally polarized waves,
    said receiver part including means for simultaneously receiving the modulation signal and the first carrier, and for achieving synchronous detection of the received modulation signal with the received first carrier so as to demodulate the modulation signal, thereby obtaining the digital output data.

2. A system as set forth in claim 1, further comprising: means for providing the first carrier; and
    a hybrid circuit connected to said providing means and having first and second outputs,
    wherein said transmitter part is connected to the first output of said hybrid circuit to receive the first carrier for producing said modulation signal, and
    wherein said transmitting means is connected to the second output of said hybrid circuit to receive the first carrier for transmission on the other of the vertically and horizontally polarized waves.

3. A system as set forth in claim 2, wherein said receiver part further comprises:
    a first mixer and a second mixer connected to receive the modulation signal and the first carrier, respectively; and
    a local oscillator connected to said first and second mixers for driving said first and second mixers.

4. A system as set forth in claim 3, wherein said transmitting means includes means for transmitting the modulation signal and the first carrier with a phase shift of about $\pi/2$ therebetween.

5. A system as set forth in claim 4, wherein both said transmitter part and said receiver part are operated under the absolute modulation method, in which a predetermined bit or bits of the modulation signal are represented fixedly by predetermined modulation signals having the same phase as that of the first carrier.

6. A system as set forth in claim 5, wherein said receiver part further comprises a delay circuit, operatively connected to said second mixer, for shifting the first carrier in phase selectively by substantially $\pi/2$.

7. A system as set forth in claim 6, wherein said transmitting means further comprises:
   a polarizer, operatively connected to said hydrid circuit, for adding the modulation signal and the first carrier; and
   a common vertically/horizontally polarized wave antenna, operatively connected to said polarizer, for transmitting the added signal, and wherein said receiver part further comprises:
   a receiver side common vertically/horizontally polarized wave antenna for receiving the added signal; and
   a receiver side polarizer, operatively connected to said receiver side common vertically/horizontally polarized wave antenna, for separating the modulation signal and the first carrier.

8. A system as set forth in claim 6, wherein said transmitting means further comprises vertically and horizontally polarized wave antennas for transmitting the modulation signal and the first carrier separately, and vice versa, respectively, and wherein said receiver part comprises receiver side vertically and horizontally polarized wave antennas for receiving the modulation signal and the first carrier, separately, and vice versa, respectively.

9. A system as set forth in claim 6, wherein said transmitter part comprises means for modulating the first carrier with the digital input data using one of PSK, ASK, FSK, MSK modulation methods, and a QAM method.

10. A system as set forth in claim 5, wherein said receiver part further comprises a 90° hybrid circuit, operatively connected to said second mixer, for shifting the first carrier in phase selectively by substantially $\pi/2$.

11. A system as set forth in claim 10, wherein said transmitting means further comprises:
   a polarizer, operatively connected to said hybrid circuit, for adding the modulation signal and the first carrier; and
   a common vertically/horizontally polarized wave antenna, operatively connected to said polarizer, for transmitting the added signal, and wherein said receiver part further comprises:
   a receiver side common vertically/horizontally polarized wave antenna for receiving the added signal; and
   a receiver side polarizer, operatively connected to said receiver side common vertically/horizontally polarized wave antenna, for separating the modulation signal and the first carrier.

12. A system as set forth in claim 10, wherein said transmitting means further comprises vertically and horizontally polarized wave antennas for transmitting the modulation signal and the first carrier separately, and vice versa, respectively, and wherein said receiver part comprises receiver side vertically and horizontally polarized antennas for receiving the modulation signal and the first carrier separately, and vice versa, respectively.

13. A system as set forth in claim 10, wherein said transmitter part comprises means for modulating the first carrier with the digital input data using one of PSK modulation, ASK modulation, FSK modulation, MSK modulation, and QAM.

14. A data transmitting-receiving system operatively connected to receive digital input data and a first carrier, comprising:

a transmitter comprising:
   means, operatively connected to receive the digital input data and the first carrier, for modulating the first carrier with the digital input data to obtain a modulation signal; and
   means, operatively connected to said modulating means and operatively connected to receive the first carrier, for transmitting the modulation signal and the first carrier on first and second polarized waves, respectively, the first and second polarized waves comprising one of a vertically polarized wave and a horizontally polarized wave, and the other of the vertically and horizontally polarized waves, respectively;
a receiver comprising:
   means for simultaneously receiving the modulation signal and the first carrier transmitted on the first and second polarized waves, respectively;
   means, operatively connected to said receiving means, for synchronously detecting the received modulation signal and the received first carrier so as to demodulate the received modulation signal to obtain digital output data corresponding to the digital input data.

15. A system as set forth in claim 14, wherein said transmitter further comprises:
   a hybrid circuit, operatively connected to receive the first carrier and operatively connected to said modulating means and said transmitting means, for providing the first carrier to said modulating means and said transmitting means.

16. A system as set forth in claim 15, wherein said receiver further comprises:
   a local oscillator for generating a second carrier;
   a first mixer, operatively connected to said receiving means and to said local oscillator, for mixing the modulation signal and the second carrier; and
   a second mixer, operatively connected to said local oscillator and said receiving means, for mixing the second carrier and the first carrier.

17. A system as set forth in claim 16, wherein said receiver further comprises a delay circuit, operatively connected to said second mixer, for shifting the first carrier in phase selectively by substantially $\pi/2$.

18. A system as set forth in claim 17, wherein said transmitting means comprises:
   a transmitter side polarizer, operatively connected to said hybrid circuit and said modulating means, for adding the modulation signal and the first carrier; and
   a transmitter side common vertically/horizontally polarized wave antenna, operatively connected to said transmitter side polarizer, for transmitting the added signal, and wherein said receiving means comprises:
   a receiver side common vertically/horizontally polarized wave antenna for receiving the added signal; and
   a receiver side polarizer, operatively connected to said receiver side common vertically/horizontally polarized wave antenna and said first and second mixers, for separating the modulation signal and the first carrier.

19. A system as set forth in claim 17, wherein said transmitter means comprises transmitter side vertically and horizontally polarized wave antennas, operatively connected to said hybrid circuit and said modulating means, for transmitting the vertically and horizontally polarized waves separately, and wherein said receiver means comprises receiver side vertically and horizontally polarized wave antennas, operatively connected to said first and second mixers, for receiving the vertically and horizontally polarized waves separately.

20. A system as set forth in claim 17, wherein said modulating means includes means for modulating the first carrier with the digital input data using one of PSK modulation, ASK modulation, FSK modulation, MSK modulation and QAM.

21. A system as set forth in claim 16, wherein said receiver further comprises a 90° hybrid circuit, operatively connected to said second mixer, for shifting the first carrier in phase selectively by substantially $\pi/2$.

22. A system as set forth in claim 21, wherein said transmitting means comprises:
a transmitter side polarizer, operatively connected to said hybrid circuit and said modulating means, for adding the modulation signal and the first carrier; and
a transmitter side common vertically/horizontally polarized wave antenna, operatively connected to said transmitter side polarizer, for transmitting the added signal, and wherein said receiving means comprises:
a receiver side common vertically/horizontally polarized wave antenna for receiving the added signal; and
a receiver side polarizer, operatively connected to said receiver side common vertically/horizontally polarized wave antenna and said first and second mixers, for separating the modulation signal and the first carrier.

23. A system as set forth in claim 21, wherein said transmitter means comprises transmitter side vertically and horizontally polarized wave antennas, operatively connected to said hybrid circuit and said modulating means, for transmitting the vertically and horizontally polarized waves separately, and wherein said receiver means comprises receiver side vertically and horizontally polarized wave antennas, operatively connected to said first and second mixers, for receiving the vertically and horizontally polarized waves separately.

24. A system as set forth in claim 21, wherein said modulating means includes means for modulating the first carrier with the digital input data using one of PSK modulation, ASK modulation, FSK modulation, MSK modulation and QAM.

25. A method for transmitting digital input data in a data transmitting-receiving system using a first carrier, comprising the steps of:
(a) modulating the first carrier with the digital input data to obtain a modulation signal;
(b) simultaneously transmitting the modulation signal and the first carrier on first and second polarized waves, respectively, the first and second polarized waves comprising one of a vertically polarized wave and a horizontally polarized wave, and the other of the vertically polarized wave and the horizontally polarized wave, respectively;
(c) simultaneously receiving the modulation signal and the first carrier transmitted in said step (b); and
(d) demodulating the modulation signal by synchronous detection of the received modulation signal and the received first carrier to obtain digital output data corresponding to the digital input data.

26. A method as set forth in claim 25, wherein said step (b) comprises transmitting the modulation signal and the first carrier with a phase shift of substantially $\pi/2$ therebetween.

27. A method as set forth in claim 26, wherein said step (b) comprises modulating the first carrier with the digital input data using one of PSK modulation, ASK modulation, FSK modulation, MSK modulation, and QAM.

* * * * *